Figure 1:
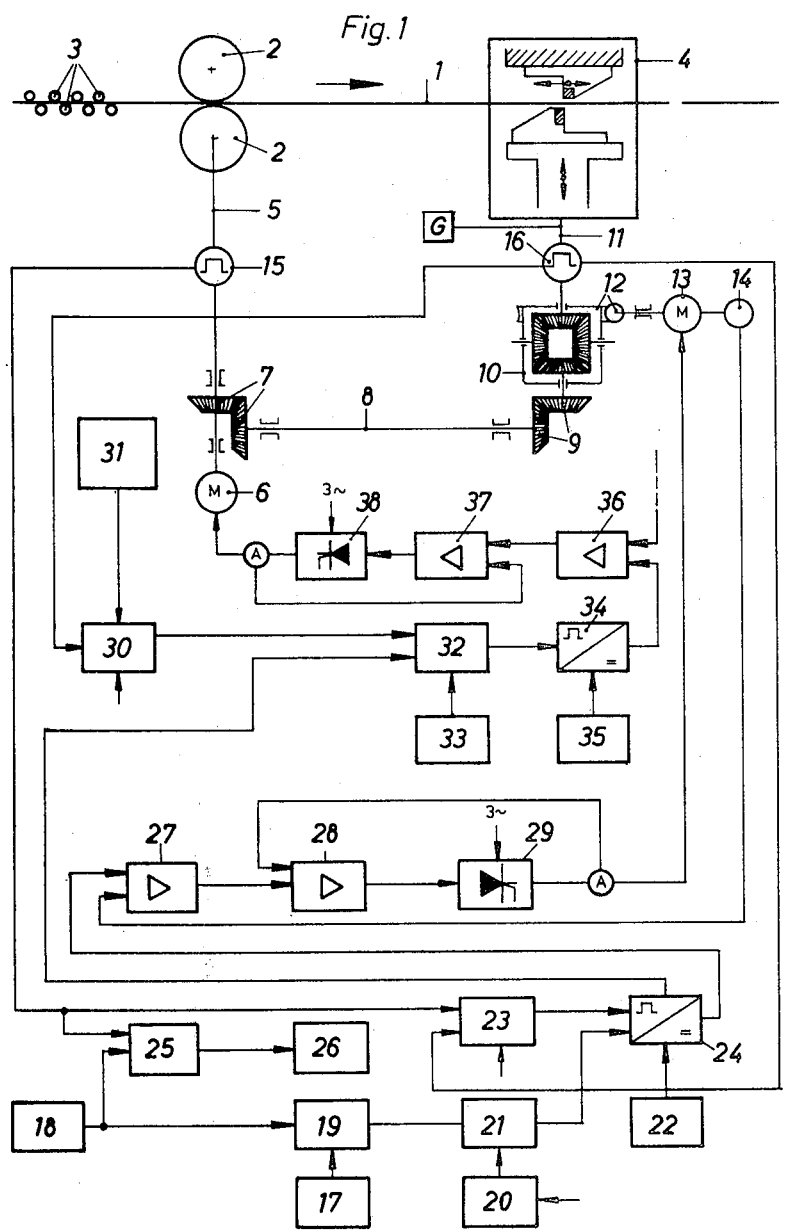

United States Patent [19]
Schneider et al.

[11] 3,982,454
[45] Sept. 28, 1976

[54] APPARATUS FOR THE CONTROL AND REGULATION OF CUTTING INTERVAL AND SYNCHRONISM AT A CUTTING MECHANISM FOR THE MACHINING OF STRIP MATERIAL

[75] Inventors: Franz Schneider; Helmut Braitinger, both of Goppingen, Germany

[73] Assignee: L. Schuler GmbH, Germany

[22] Filed: June 4, 1975

[21] Appl. No.: 583,526

[30] Foreign Application Priority Data
June 11, 1974 Germany............................ 2428219

[52] U.S. Cl. ...................................... 83/74; 83/287; 83/324
[51] Int. Cl.² .......................................... B26D 5/38
[58] Field of Search .............. 83/287, 295, 296, 74, 83/76, 324, 328

[56] References Cited
UNITED STATES PATENTS

| | | | |
|---|---|---|---|
| 1,947,399 | 2/1934 | Umansky | 83/287 X |
| 2,245,442 | 6/1941 | Morgan | 83/324 X |
| 3,156,150 | 11/1964 | Sarka | 83/324 X |
| 3,176,557 | 4/1965 | Drenning et al. | 83/324 X |
| 3,628,410 | 12/1971 | Shields | 83/287 |
| 3,706,248 | 12/1972 | Erhart | 83/74 |
| 3,730,810 | 5/1973 | Klein | 83/74 X |
| 3,742,798 | 7/1973 | Gries | 83/324 X |
| 3,826,169 | 7/1974 | Schnell et al. | 83/74 X |

*Primary Examiner*—Frank T. Yost
*Attorney, Agent, or Firm*—Craig & Antonelli

[57] ABSTRACT

Apparatus for the control and regulation of the cutting interval for a strip advanced by a roll feed device and of the synchronism of a cutting mechanism effecting the cutting operation with the strip material during the cutting step. A common main drive serves for effecting movements of the cutting mechanism and of the strip material along its travel path and an auxiliary drive is effective on movements of one of the cutting mechanism and the strip material by way of a superposed gear system. The control apparatus includes a desired value pickup device for providing an output indicative of the cutting interval, at least one actual value pickup device for providing an output indicative of at least one of the length of material traversed since the preceding cutting step and the travel velocity of the strip material and at least one of the stroke length and travel velocity of the cutting mechanism, comparison devices for comparing the actual values of at least one of the travel velocities and the lengths of the strip material and cutting mechanism with each other and with the desired value of the cutting interval, and a control arrangement for regulating at least the auxiliary drive until the cutting step is conducted.

18 Claims, 2 Drawing Figures

APPARATUS FOR THE CONTROL AND REGULATION OF CUTTING INTERVAL AND SYNCHRONISM AT A CUTTING MECHANISM FOR THE MACHINING OF STRIP MATERIAL

The present invention relates to an apparatus for the control and regulation of the cutting interval for a strip material advanced by means of a roll feed means, for example a paper, cardboard, textile, or sheet-metal strip, and of the synchronism of the cutting mechanism effecting the cutting operation with the strip material during the cutting step, wherein movements of the cutting mechanism and of the strip material along its travel path are derived from a common main drive, and wherein an auxiliary drive is additionally effective on one of these movements by way of a superposed gear system.

A conventional apparatus of this type with a cutter fashioned as a punch for cutting labels from paper strip DOS (German Unexamined Laid-Open Application) No. 1,919,311 is provided with a photocell for scanning markings provided on the strip material fed to the apparatus. The signals of the photocell are transmitted to a computer which controls the travel velocity of the strip material by means of the auxiliary drive effective on the roll feed mechanism so that the punching device cuts out exactly one label during each cutting operation. In this apparatus, the punching device is furthermore supported in a lever linkage which imparts to the cutter during each cutting step a motion directed along the travel path of the strip material by means of a crank rigidly coupled with the cutting drive. The stroke length can be varied with the respective cutting operation by adjusting a fulcrum of the lever linkage. Since, in this apparatus, the crank operating the lever linkage and the cutter drive, likewise operated via a crank, are fixedly coupled with the main drive, any adjustment of the fulcrum achieves only a certain change in the travel velocity of the cutter along the travel path corresponding to the characteristic of the crank and of the lever linkage, in accordance with the alteration of the stroke length of the cutter along the travel path of the strip material. Consequently, it is impossible by means of this conventional apparatus to effect independent variations of stroke length and travel velocity of the cutter along the travel path of the strip material. Also, the known device has no means for regulating the travel velocity and the stroke length of the cutter along the travel path of the strip material, since this device only comprises means for the adjustment of the fulcrum.

It is therefore an object of the present invention to further develop an apparatus of the type mentioned hereinabove so that also the stroke length and the travel velocity of the cutter can be regulated along the travel path of the strip material, in order to be able to achieve synchronism between the cutter and the strip material during the cutting operation. This is of importance especially in case of a rather stiff strip material, such as cardboard or sheet-metal strip.

Another object of the present invention is to construct the apparatus so that the regulating step can be executed independently of any previously applied markings on the strip material.

In accordance with the present invention, there is provided, in connection with an apparatus of the aforementioned kind, a desired value pickup device or transducer for the cutting interval, e.g. the cutting length, and an actual value pickup device or transducer for the stroke length traversed since the preceding cutting step and the travel velocity of the strip material and for the stroke length and travel velocity of the cutter. Circuit arrangements are provided for comparing the actual values of the travel velocities of the strip material and the cutter and for comparing the actual values of the stroke lengths of the strip material and the cutter with each other and with the desired value of the cutting interval and are connected to the desired value and actual value pickups. The comparison circuits are connected to a control value pickup device which influences the auxiliary drive and executes a regulating operation, until the cutting step is conducted, with respect to identity of the actual values of the travel velocities and coincidence of the desired value of the cutting interval with the actual value of the stroke length traversed by the strip material.

An advantage of the apparatus according to the present invention resides also in that the regulating step to achieve synchronism and a correct cutting interval can be attained by means of a control step with the aid of the control value pickup device which is effective only on the auxiliary drive.

The required desired value and actual value pickup devices can be of a digital or analog construction and can detect the desired and actual values in an absolute or incremental representation. The design of the comparison circuits and of the control value pickup devices are adapted to the conditions resulting from the type of the desired value and actual value pickup devices. Furthermore, it is possible to provide actual value pickup devices which detect the related stroke lengths and travel velocities either in the form of linear motions or in the form of rotary motions.

Also, the type of cutting mechanism to be utilized in the apparatus of this invention can be selected in dependence on the respectively given requirements, so that the cutting mechanism can be, for example, a punch along the lines of the type discussed hereinabove (DOS No. 1,919,311), a rotary shear device of a conventional type (U.S. Pat. No. 2,850,092), or a shear mechanism of a conventional type which reciprocates linearly (U.S. Pat. No. 3,299,757).

Advantageous embodiments of the apparatus according to the present invention reside in that respectively only a single actual value pickup device is provided for the movement of the strip material, on the one hand, and/or for the motion of the cutter, on the other hand, wherein the output signals of one actual value pickup device can be evaluated respectively in accordance with the stroke length and the travel velocity. This can be realized in case of an actual value pickup device constructed as a pulse generator, for example, by detecting in a respective comparison circuit the number of the pulses as well as the number of the pulses per unit time.

It is furthermore advantageous to connect the actual value pickup device or devices for the movement of the strip material to a roll in contact with the strip material, e.g. a roll of the roll feed mechanism or a separate measuring roll, and/or to connect the actual value pickup device or devices for the movement of the cutter to the drive shaft of the latter. Rotary pickup means ordinarily are of a simple construction and are not as trouble-prone.

A particularly simple construction of the apparatus according to the present invention results by designing the drive connections of the main drive with the roll feed mechanism and the cutter so that, during the standstill of the auxiliary drive, the travel velocities of the strip material and the cutter are identical to each other at least in the stroke section associated with the cutting step. In this embodiment, the determination that the condition of identity between the actual values of the travel velocities has been fulfilled can be made solely by ascertaining that the auxiliary drive has reached its standstill position. The actual value pickup devices for the travel velocities with the associated comparison circuit are thus based on a circuit arrangement ensuring the dependence of the actuation of the cutting drive for the cutter, i.e. the triggering of the cutting step, before the auxiliary drive has reached its standstill position. This construction can be realized, for example, by an AND gate circuit with a reversing stage connected in front thereof.

A construction of the apparatus of the present invention of particularly great versatility and accuracy in operation can be attained by fashioning the cutter as a conventional, linearly reciprocating shear mechanism, the drive shaft of which is connected to a mechanical gear system converting each uniform rotation of the drive shaft successively into respectively one motion component of the shear mechanism of an accelerated, approximately uniform and retarded movement in the feeding direction and one motion component of the shear mechanism of the same total length in the opposite direction. A linearly reciprocating shear mechanism makes it possible to guide the cut in an especially accurate manner, which is important particularly in case of a thick strip material, such as corrugated cardboard or sheet metal and which brings advantages in conjunction with the accurate regulation of the cutting interval.

A digitally operating embodiment of the apparatus according to the present invention resides in that the actual value pickup devices are constructed as two pulse generators detecting the movements of the strip material, on the one hand, and of the cutter, on the other hand, these generators providing an output with opposite counting directions to a bidirectional or up-down counter, which is reset to "zero" after each cutting step and constantly forms the difference of the actual values of the stroke lengths of the strip material and the cutter and provides a positive or negative output corrected actual value. The desired value pickup device is constructed as a numerical setting member providing an output to an adder also receiving an input of a numerical basic desired value for the cutting interval corresponding to the constant standstill of the auxiliary drive. The adder delivering a positive or negative output corrected desired value and the outputs of the up-down counter and of the adder are connected to the control value pickup device. In this particularly simple embodiment, the prerequisite must be met that the drive connections of the main drive with the roll feed mechanism and with the cutter are designed so that, when the auxiliary drive is at a standstill, the travel velocities of the strip material and the cutter are identical at least in the stroke length section associated with the cutting operation, and that the auxiliary drive is effective by way of the superposed gear system on the movements of the cutter, which is especially advantageous in case of a heavy strip material directly pulled off a reel.

Basically, the following advantageous mode of operation results from the above construction. After each cutting step, a digital corrected desired value with the correct arithmetic sign is provided as the output of the adder. The number of pulses equal to this corrected desired value, supplied by a timing pulse or clock generator having the basic frequency of the apparatus, is delivered by a corrected-path counter to the control value pickup device. The up-down counter constantly feeds the corrected actual value, likewise in the form of pulses, to the control value pickup device. The control values formed by the control value pickup device affect the auxiliary drive along the lines of an immediate retardation or acceleration of the cutter motion, namely until a number of pulses corresponding to the corrected desired value has passed from the up-down counter in the form of pulses of the corrected actual value to the control value pickup device, whereby basically the standstill of the auxiliary drive has been attained. Thereafter, the control value pickup device only yields control values based on differences in the numbers of pulses transmitted by the pulse generators, whereby accidental deviations, e.g. by gear play, are compensated for. This is achieved by means of minor adjustments of the auxiliary drive which basically is already at a standstill. Due to the mechanical construction of the cutting mechanism and/or corresponding switching means, it is ensured that the triggering of the cutting step can take place only after the basic standstill position of the auxiliary drive has been reached.

Additional embodiments of the apparatus according to the present invention provide means for regulating the main drive in dependence on the time required by the control value pickup device with the auxiliary drive affected thereby in order to effect a control, until the cutting step is executed, with respect to identity of the actual values of the travel velocities and coincidence of the desired value of the cutting interval with the actual value of the travel path traversed by the strip material. These regulating means serve for increasing the speed of the main drive and thus the operating speed realized by the apparatus, as maximally attainable considering the time required by the control value pickup device for effecting the regulating step with the aid of the auxiliary drive.

An embodiment of the aforedescribed, digitally operating type of device according to the present invention consists in that the control value pickup device provides an additional output of the thus-formed control value in digital form to a comparator connected with an adjustable control value preselector. The output of the pulse generator detecting the movements of the cutting mechanism is additionally connected to a counter connected with an adjustable pulse number preselector. The counter provides an output to the comparator and controls the latter by actuating the counter as soon as the number of pulses set in the pulse number preselector and coming from the pulse generator has accumulated in the counter whereby the comparator, when actuated by the counter, compares the control value present in the control value preselector with digital control value obtained from the control value pickup device, thereby forming and providing an output of an additional control value for the motor of the main drive in correspondence with the positive or negative deviation and with the correct arithmetic sign.

This construction results basically in the following advantageous mode of operation. A specific number of pulses is set in the pulse number preselector, which number is smaller than the number of pulses transmitted by the pulse generator during an entire operating cycle of the cutting mechanism. The difference is chosen so that the time corresponding to the residual number of pulses is sufficient for correspondingly increasing or reducing the travel velocity of the strip material, as required. In the form of a number of pulses, the control value must be set in the control value preselector which can be processed by the control means of the auxiliary drive within the time period corresponding to the difference between the number of pulses set in the pulse number preselector and the number of pulses corresponding to the beginning of the cutting operation transmitted by the pulse generator. In case of actuation by the counter, the number of pulses set in the control value preselector is compared with the number of pulses of the control value for the auxiliary drive still present at the control value pickup device. If the latter number is smaller than the former, the main drive is accelerated and thus the travel velocity of the strip material is increased, and in the converse case, this travel velocity is reduced. In case the numbers coincide with each other, the main drive is not influenced. This control procedure can be effected in a purely qualitative manner, wherein always a control value of a certain magnitude is supplied for the main drive; or the procedure can be accomplished quantitatively, wherein the size of the control value depends on the magnitude of the deviation determined by the comparator.

Another arrangement of the aforedescribed, digitally operating embodiment of the device of the present invention resides furthermore in that the control value pickup device provides an additional output of the thus-formed control value in digital form which is fed to a comparator connected to an adjustable or threshold value preselector. A signal generator yielding a signal at a settable angular position is provided at the drive shaft of the cutting mechanism which signal generator is connected to an interrogator circuit connected with the comparator, this circuit providing a limit signal when triggered by the signal from the signal generator, if the comparator indicates that the control value has exceeded the limit value. Further, the interrogator circuit is connected to a starting acceleration pickup device for the motor of the main drive, wherein a limit signal fed thereto limits the starting acceleration.

The above construction results basically in the following advantageous mode of operation. A specific number of pulses is set in the limit value preselector and the signal generator is set in a specific angular position with respect to the drive shaft, wherein the settings are to be effected in mutual dependency so that the time corresponding to the rotation of the drive shaft from the set angular position to the triggering of the cutting operation of the cutter is still sufficient to effect a corrective control of the number of pulses set in the limit value preselector in connection with the auxiliary drive. When the signal supplied by the signal generator triggers the interrogator circuit, the still present control value is compared with the set limit value and, if the former is greater than the latter, a limit signal is transmitted to the starting acceleration pickup device for the motor of the main drive. Thereby, the starting acceleration of the motor of the main drive is limited and terminated. In this connection, the starting acceleration pickup device can be provided with a storage element for the thus-obtained value of the engine speed of rotation, so that this speed is maintained.

Figure 2:
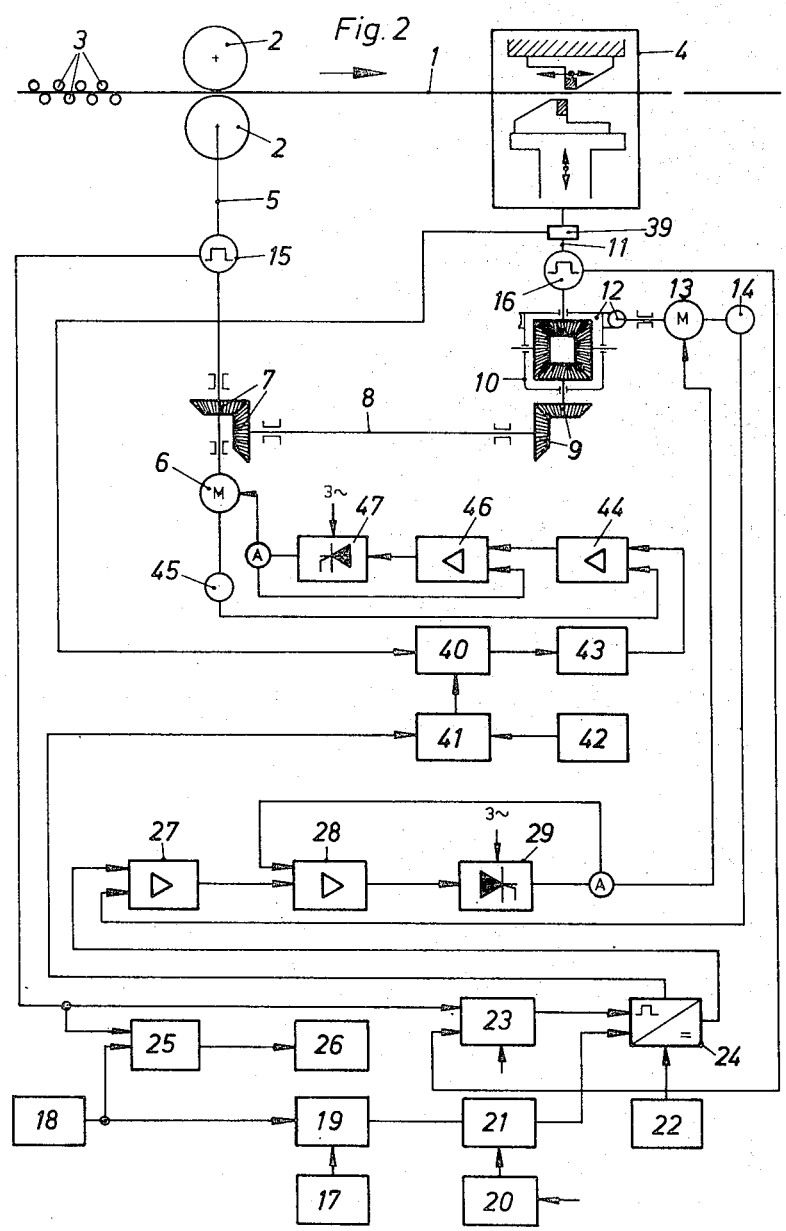

These and further objects, features and advantages of the present invention will become more apparent when taken in connection with the accompanying drawings, which show for purposes of illustration only, several embodiments in accordance with the present invention and wherein the drawings illustrate two digitally operating embodiments of the apparatus according to this invention, in the form of schematic representations with regard to the mechanical portion and in the form of block circuit diagrams with respect to the electrical portion, and:

FIG. 1 shows an apparatus according to the present invention with an accelerating or retarding control of the motor of the main drive; and FIG. 2 shows an apparatus according to the present invention with a control for limiting the starting acceleration of the motor of the main drive.

Referring now to the drawings wherein like reference numerals are utilized to designate like parts throughout the several views, there is shown in FIG. 1 strip material 1 drawn by means of rolls 2 through an aligning device 3 and further moved into the operating zone of a cutting mechanism 4 constructed as linearly reciprocating shears. The rolls 2 are driven by way of a drive shaft 5 by a motor 6 of a main drive of the apparatus. The drive of an intermediate shaft 8 is derived by way of a bevel gear pair 7 and this intermediate shaft drives via a further bevel gear pair 9 the first member of a differential gear 10, the second member of which is connected to a drive shaft 11 of the cutting mechanism 4. The third member of the differential gear 10 is driven by way of a worm gear unit 12 by a motor 13 of the auxiliary drive, the speed of rotation of which is detected by a tachogenerator 14. A pulse generator 15 is connected to the drive shaft 5 of the rolls 2, and a pulse generator 16 is connected to the drive shaft 11 of the cutting mechanism 4. The number of pulses transmitted by the pulse generators 15, 16 are respectively a measure for the rotary travel paths traversed by the drive shafts, 5, 11, associated with the travel paths of the strip material 1 and the cutter 4. A mechanical gear unit —, schematically shown as block G, —is connected to the drive shaft 11, translating each uniform rotation of the drive shaft 11 successively into respectively one motion component of the shears of an accelerated, approximately uniform, and decelerated movement in the feeding direction, and into one motion component of the shears of the same total length in the opposite direction.

A basic desired value for the cutting interval is adjusted stepwise at a numerical setting member 17 in units of length. This basic desired value depends on the design of the drive connections between the drive shafts 5, 11 and requires correction only if the drive connections are altered. A desired value for the cutting interval is set or adjusted stepwise at a numerical setting member 18 in units of length, wherein a change in the setting is respectively effected in each case that the cutting interval is to be changed. The setting members 17, 18 provide digital output values and transmit same to an adder 19 which latter forms a digital corrected desired value output therefrom having the correct arithmetic sign and which represents a measure of the deviation of the set, desired cutting interval from the basic cutting interval corresponding to standstill of the auxiliary drive. A timing pulse generator 20 provides a basic frequency clock or pulse signal for the apparatus and is, in turn, repectively actuated after a cutting step has been terminated by means of the cutting mechanism 4. Thereafter, a number of pulses equal to the corrected desired value present at the output of the adder 19 is transmitted by a corrected-path counter 21 to a control value pickup device 24.

An up-down counter 23 is operated, just as the timing pulse generator 20, after each termination of a cutting operation, by the cutting mechanism 4 and is thereby reset to "zero". Thereafter, the counting of the pulses transmitted by the pulse generators 15, 16 effected with opposite counting directions, commences in each case in the up-down counter 23, the difference between the up and down counts being outputted by the counter as a digital corrected actual value having the correct arithmetic sign. The control value pickup device 24 first processes the pulses of the corrected desired value supplied by the corrected-path counter 21 and the digital corrected actual values supplied by the up-down counter 23 in a continuous operation to provide a digital control value which is constantly converted in the control value pickup device 24 into an analog control value for the motor 13 of the auxiliary drive. The proportionality factor utilized during this conversion in the control value pickup device 24 is determined by the adjustment of the setting member 22 and is supplied to the control value pickup device 24.

The analog control value constantly transmitted by the control value pickup 24 is effective on the motor 13 of the auxiliary drive via a speed governor 27 having also supplied thereto the actual speed value from the tachogenerator 14 and providing an output to a current regulator 28 having also supplied thereto the actual current value and providing an arrangement via a rectifier 29 connected to the mains for controlling the motor 13.

Additionally, a control member 25 for the cutting interval is connected to receive the output of the setting member 18 for the desired value of the cutting interval and to receive the output of pulse generator 15 of the shaft 5. This control member, in turn, actuates an indicator 26 for indicating the actual value of the cutting interval or for indicating the deviation of the actual value from the desired value of the cutting interval. Further, an alarm signal can be triggered and/or the apparatus can be shut off by means of the control member 25.

In the apparatus illustrated in FIG. 1 wherein an accelerating or retarding control of the motor 6 of the main drive is provided, a counter 30 is additionally connected to receive the output of the pulse generator 16. The counter 30 is furthermore connected to a pulse number preselector 31 and is respectively operated after each cutting step of the cutter 4 to be reset to "zero". The counter 30 is connected to a comparator 32 for providing an output and actuating the comparator. The comparator 32 is also connected to a control value preselector 33 and further receives the digital output portion of the control value pickup device 24 by which the respectively present number of pulses of the control value for the motor 13 of the auxiliary drive is transmitted to the comparator 32.

The digital output signals fed by the comparator 32 to a control member 34 connected thereto are converted by the control member 34 into an analog control value. The proportionality factor to be utilized during this conversion is determined by the setting of a setting member 35 connected to the control member 34. The analog control value transmitted by the control member 34 is effective on the motor 6 of the main drive via a speed governor 36 influenced additionally by the general control and/or regulation of the apparatus, via a current regulator 37 to which is furthermore fed the actual current value, and via a rectifier arrangement 38 connected to the mains.

In FIG. 2, there is illustrated an apparatus wherein the starting acceleration of the motor 6 of the main drive is limited by a control arrangement. A signal generator 39 is provided on the drive shaft 11 of the cutting mechanism 4, and this generator provides an output signal in accordance with an adjustable angular position of the drive shaft 11. This signal generator can also be in the form of an additional, adjustable tap at the pulse generator 16. The signal generator 39 is connected to an interrogator circuit 40 to which it applies a signal when the drive shaft 11 passes through the set angular position.

Furthermore, the digital portion of the control value pickup device 24 is connected to a comparator 41 also having an adjustable limit value preselector 42 connected thereto, the comparator providing an output to the interrogator circuit 40. The interrogator circuit 40, in response to a signal from the signal generator 39 and a signal from the comparator 41 indicating that the control value present at the output of the control value pickup device 24 exceeds the limit value set in the limit value preselector 42, provides a limit output signal to a starting acceleration pickup device 43 for the motor 6. The starting acceleration pickup device 43 is effective on the motor 6 of the main drive via a speed governor 44 to which is also fed the actual speed value of the motor 6 of the main drive from a tachogenerator 45, via a current regulator 46 to which is also fed the actual current value, and via a rectifier arrangement 47 connected to the mains so as to control the starting acceleration.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Apparatus for the control and regulation of the cutting interval for a strip material advanced by roll feed means and of the synchronism of a cutting mechanism effecting the cutting operation with the strip material during the cutting step, wherein a common main drive serves for effecting movements of the cutting mechanism and of the strip material along its travel path and an auxiliary drive is additionally effective on movements of one of the cutting mechanism and the strip material by way of a superposed gear system, the apparatus comprising desired value pickup means for providing an output indicative of the cutting interval, at least one actual value pickup means for providing an output indicative of at least one of the length of the strip material traversed since the preceding cutting step and the travel velocity of the strip material and at least one of the stroke length and travel velocity of the cutting mechanism, comparison means responsive to the desired and actual value pickup means for comparing the actual values of at least one of the travel velocities of the strip material and the cutting mechanism and of the length of the strip material traversed since the preceding cutting step and the stroke length of the cutting mechanism with each other and with the desired value of the cutting interval, the comparison means being connected to control value pickup means for regulating at least the auxiliary drive until the cutting step is conducted.

2. Apparatus according to claim 1, wherein said control value pickup means serves for controlling at least the auxiliary drive to ensure at least one of identity of the actual values of the travel velocities of the strip material and the cutting mechanism and of coincidence of the desired value of the cutting interval with the actual value of the length traversed by the strip material before conducting the cutting step.

3. Apparatus according to claim 1, wherein the strip material is one of paper, cardboard, textile, and sheet metal.

4. Apparatus according to claim 1, wherein the auxiliary drive is effective on the movement of the cutting mechanism.

5. Apparatus according to claim 1, wherein a single actual value pickup means is provided for providing an output indicative of the movement of the strip material.

6. Apparatus according to claim 5, including means responsive to the output of the actual value pickup means for determining the traversed length of the strip material and the travel velocity.

7. Apparatus according to claim 1, wherein a single actual value pickup means is provided for providing an output indicative of the movement of the cutting mechanism.

8. Apparatus according to claim 7, including means responsive to the output of the actual value pickup means for determining the stroke length and the travel velocity of the cutting mechanism.

9. Apparatus according to claim 1, wherein the at least one actual value pickup means providing an output indicative of the movement of the strip material is connected with a roll of the roll feed means in contact with the strip material.

10. Apparatus according to claim 1, wherein the at least one actual value pickup means providing an output indicative of the cutting mechanism is connected to a drive shaft of the cutting mechanism.

11. Apparatus according to claim 1, wherein the drive connections of the main drive with the roll feed means and the cutting mechanism are arranged so that, during standstill of the auxiliary drive, the travel velocities of the strip material and of the cutting mechanism are identical at least in the motion component associated with the cutting step.

12. Apparatus according to claim 1, wherein the cutting mechanism is a linearly reciprocating shear unit, a mechanical gear system being connected to the drive shaft of the shear unit and converting each uniform rotation of the drive shaft successively into respectively one motion component of the shears of an accelerated, approximately uniform, and decelerated motion in the feeding direction, and into one motion component of the shears of the same total length in the opposite direction.

13. Apparatus according to claim 11, wherein the at least one actual value pickup means include first pulse generator means for detecting the movements of the strip material and second pulse generator means for detecting the movements of the cutting mechanism, the first and second pulse generator means supplying outputs in opposite counting directions to an up-down counter, the up-down counter providing an output of the corrected actual value having the correct arithmetic sign in accordance with the difference in the outputs of the first and second pulse generator means, the up-down counter being reset to zero after each cutting operation.

14. Apparatus according to claim 13, wherein the desired value pickup means includes a numerical setting member providing an output to an adder means, the adder means further receiving an output of a numerical basic desired value of the cutting interval corresponding to the constant standstill of the auxiliary drive, the adder means providing an output of a corrected desired value having the correct arithmetic sign, the outputs of the up-down counter and the adder means being supplied to the control value pickup means.

15. Apparatus according to claim 14, wherein the control value pickup means includes means responsive to the outputs of the adder means and the up-down counter for providing a digital output of a control value, the digital control value being supplied to a comparator connected to an adjustable control value preselector, the output of the second pulse generator means also being supplied to a counter connected to an adjustable pulse number preselector, the counter providing an output to the comparator for actuating the comparator when the number of pulses from the second pulse generator means reaches the count set in the counter by the pulse number preselector, the comparator being responsive to the counter for comparing the control value supplied from the control value preselector with the digital control value from the control value pickup means and for providing in accordance with positive or negative deviation an output control value having the correct arithmetic sign for controlling a motor of the main drive.

16. Apparatus according to claim 14, wherein the control value pickup means includes means responsive to the outputs of the adder means and the up-down counter for providing a digital output of a control value, the digital value being supplied to a comparator connected to an adjustable limit value preselector, a signal generator being provided on the drive shaft of the cutting mechanism for providing an output signal in accordance with an adjustable angular position of the drive shaft, the signal generator supplying the output to an interrogator circuit connected to the comparator, the interrogator being responsive to the signal generator and the comparator for generating a limit signal when the comparator provides an output indicating that the limit value set by the adjustable limit value preselector has been exceeded by the control value, the interrogator circuit supplying the limit signal to a starting acceleration pickup means of a motor for the main drive whereby the starting acceleration is limited.

17. Apparatus according to claim 15, wherein the control value pickup means includes means for providing an analog control value output, speed governor means responsive to the analog control value and an output indicative of the speed of a motor for the auxiliary drive for providing an output to a power circuit regulating means for controlling the motor of the auxiliary drive.

18. Apparatus according to claim 16, wherein the control value pickup means includes means for providing an analog control value output, speed governor means responsive to the analog control value and an output indicative of the speed of a motor for the auxiliary drive for providing an output to a power circuit regulating means for controlling the motor of the auxiliary drive.

* * * * *